Figure 1:
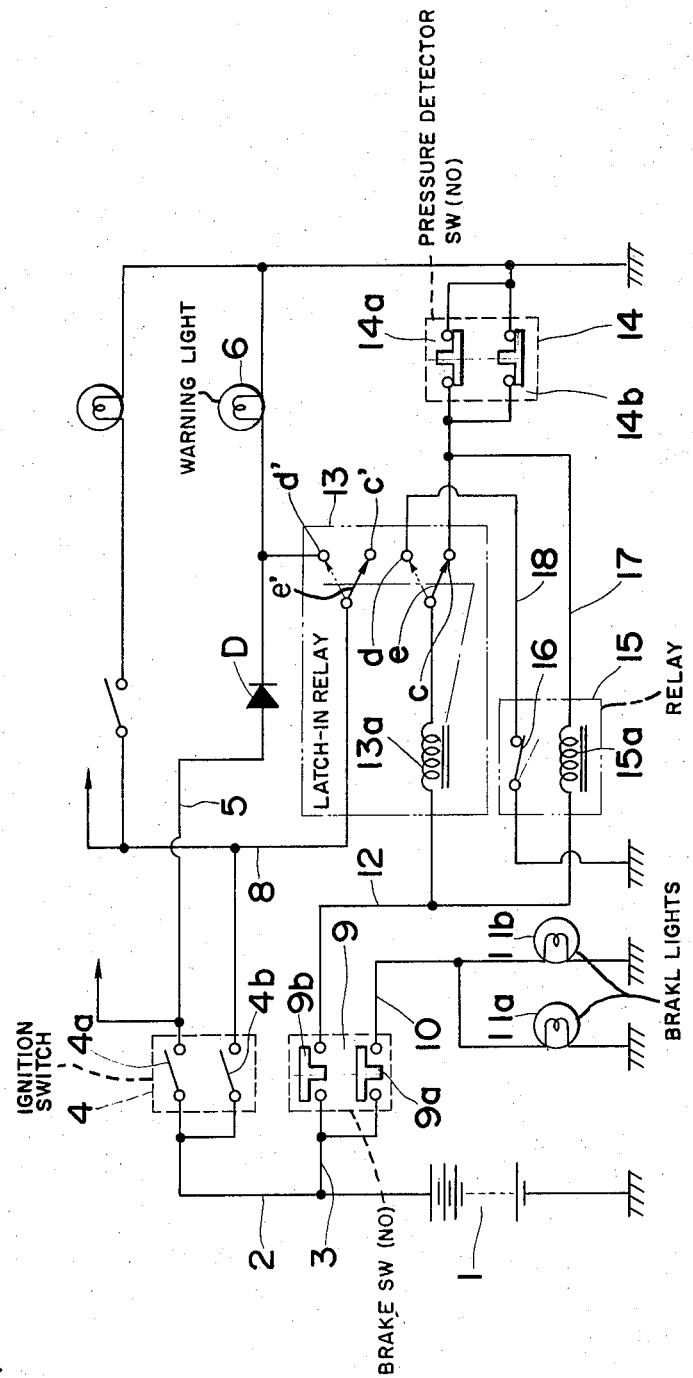

United States Patent [19]
Suzuki

[11] 3,810,087
[45] May 7, 1974

[54] FAILURE WARNING APPARATUS FOR OIL PRESSURE BRAKE

[75] Inventor: Masaru Suzuki, Chiryu, Japan

[73] Assignee: Kabushiki Kaisha Tokai Rika Denki Seisakusho, Nishikasugai-gun, Aichi-ken, Japan

[22] Filed: July 20, 1972

[21] Appl. No.: 273,424

[30] Foreign Application Priority Data
July 21, 1971   Japan ........................... 46-64615

[52] U.S. Cl. ............. 340/52 B, 180/82 R, 188/1 A, 340/60
[51] Int. Cl. .......................................... G08b 21/00
[58] Field of Search ............ 340/52 B, 52 C, 60, 69, 340/240; 188/1 A; 180/82 R; 200/81.4; 317/155, 154; 73/39

[56] References Cited
UNITED STATES PATENTS
2,645,766   7/1953   McDowell ............................ 340/60
3,688,255   8/1972   Klein et al. ........................ 340/52 C Primary Examiner—John W. Caldwell
Assistant Examiner—Joseph E. Nowicki
Attorney, Agent, or Firm—Craig and Antonelli

[57] ABSTRACT

A failure warning apparatus for an oil pressure brake in which a latch-in relay is actuated, when the oil pressure brake is out of order, so as to light a warning lamp until the failure is repaired, thereby to prevent a driver from driving continuously without repairing a failure of the oil pressure brake.

8 Claims, 2 Drawing Figures

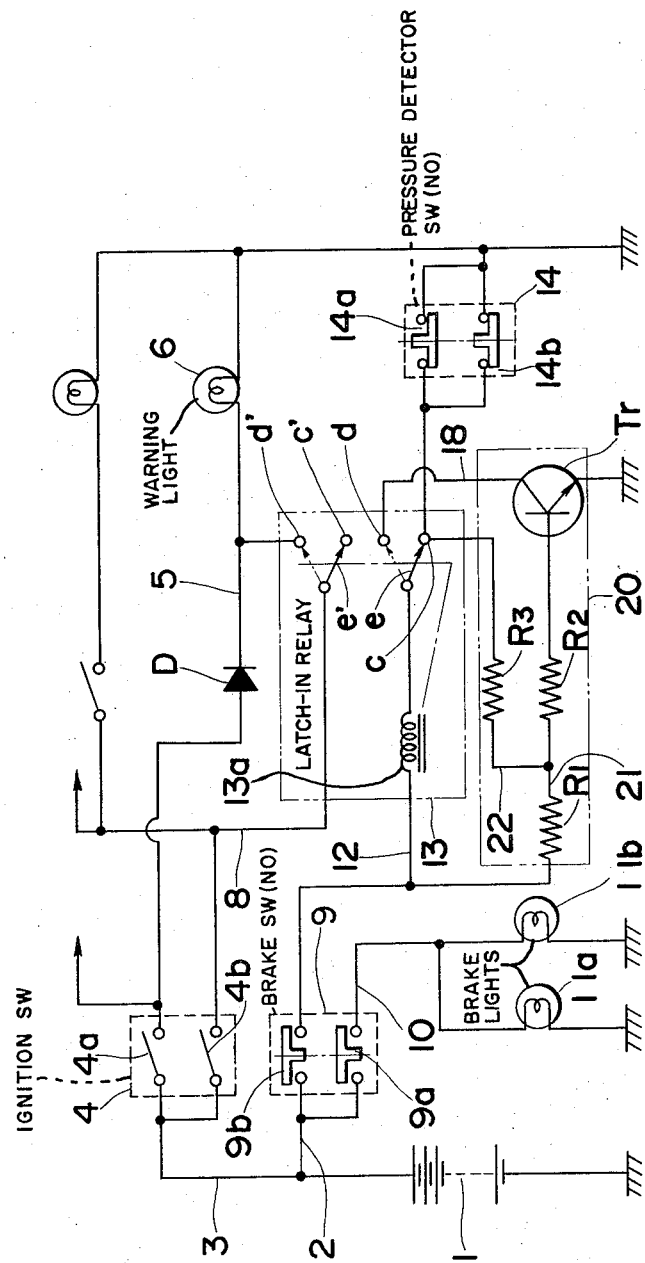

FAILURE WARNING APPARATUS FOR OIL PRESSURE BRAKE

The present invention relates a failure warning apparatus for an oil pressure brake wherein the circuit connection thereof is so arranged that the closing condition of a circuit for a warning lamp is kept on until the failure of the brake is repaired, and is automatically turned to the opening condition after the failure has been repaired.

In the conventional oil pressure brake of the vehicle is provided a failure warning apparatus for informing a driver of the failure of the brake only when he has stepped on the brake pedal, so that the repair thereof is sometimes postponed if he forgets the indication of the warning apparatus, which is put out when the brake pedal is not depressed.

Accordingly, the essential object of the present invention is to provide a failure warning apparatus for an oil pressure brake wherein the operating condition of the warning apparatus such as a lamp under the failure of the oil pressure brake is kept on disregarding the operation of the brake pedal until the failure is repaired.

Another important object of the present invention is to provide a failure warning apparatus for an oil pressure brake wherein the warning apparatus operating under the failure of the oil pressure brake is automatically stopped after the failure has been repaired.

Further object of the present invention is to provide a failure warning apparatus for an oil pressure brake which is adapted to be conveniently made in various forms, which is simple and compact in design, which is durable in construction, and which is capable of performing its intended functions in an entirely satisfactory and trouble-free manner.

The present invention will become apparent from the following full description of the present invention taken in conjunction with preferred embodiments thereof with reference to the accompanying drawings, in which;

FIG. 1 is an electric circuit block diagram showing a first preferred embodiment in accordance with the present invention and illustrating the condition in which a failure of the fluid pressure brake has been detected; and FIG. 2 is an electric circuit block diagram showing a second preferred embodiment thereof and illustrating the condition in which a failure of the fluid pressure brake has been detected.

Before we proceed with the description of the present invention, it is to be noted that like parts are designated by like reference numerals throughout the several views of the accompanying drawings.

Referring now to FIG. 1, a power battery 1 is connected in series with an engine driving circuit 2 which is connected in parallel with a braking light circuit 3. In the engine driving circuit 2, there is provided a key switch 4 including a pair of operable switch contacts, that is, a starter switch 4a and a ignition switch 4b which are connected in parallel with each other and operated together as one unit. A disconnecting checking circuit 5 for a warning lamp 6 of which lighting indicates failure of the oil pressure brake of a vehicle is connected in series with the starter switch 4a through a diode D. On the other hand, the igniter switch 4b is connected in series with a warning lamp circuit 8 which is connected in series with the warning lamp 6 through a change-over contact $d'$ of a latch-in relay 13 described later in detail. The latch-in relay is one in which the relay maintains its contacts in the last position assumed without the need of maintaining coil energization as defined in the IEEE Standard Dictionary of Electrical and Electronic Terms. In the braking light circuit 3, there is provided a brake switch 9 including a pair of operable switch contacts 9a and 9b which are connected in parallel with each other and operated together to the ON position by stepping on the brake pedal. One 9a of the switch contacts is connected in series with a pair of braking lamps 11a and 11b which are connected in parallel with each other while the other 9b of the switch contacts is connected in series with a control circuit 12 for the warning lamp circuit 8. In the control circuit 12, there are provided a multiple contacts-latch-in relay 13 and a abnormal pressure-detecting switch 14 which are connected in series with each other and operated together to the ON position on detecting of failure in the front and back two-system oil pressure brake of a vehicle, the abnormal pressure-detecting switch 14 including a pair of operable switch contacts 14a and 14b which are connected in parallel with each other. The multiple contacts-latch-in relay 13 is provided with a relay coil 13a connected in series with the switch contact 9b, a shiftable contact member $e$ which is connected in series with the relay coil 13a and performs a switching action upon energizing of the relay coil 13a, and a shiftable contact member $e'$ which is connected in series with the ignition switch 4b and operatively cooperates with the contact member $e$. The contact member $e$ normally contacts with a terminal contact $c$ of the pressure-detecting switch 14 and switches to contact to a change-over contact $d$ by the transfer action, while the contact member $e'$ and switches to contact to a change-over contact $d'$, which is connected with the warning lamp 6, in accordance with the transfer action of the contact member $e$. A relay 15 is provided which a relay coil 15a witch is provided in a coil driving circuit 17 connected between the switch-contact 9b and the detecting switch 14, and a normally closed contact 16 which is provided in a return circuit 18 connected with the change over contact $d$, the contact 16 being operated upon energizing of the relay coil 15a.

In this arrangement of the first embodiment as described hereinabove, if the oil pressure brake is out of order when the brake pedal is depressed, the oil in the brake oil pressure circuit cannot increase the pressure sufficiently. Accordingly, at least one of the abnormal-pressure-detecting switches 14a and 14b keeps its ON position upon detection of the failure of the oil pressure in the brake oil pressure circuit, and the control circuit 12 is closed by the brake switch 9 which is actuated to the ON position at the same time. Thus, the coil 13a of the latch-in relay 13 is energized and the movable contact members $e$ and $e'$ are thereby switched to the change-over-contact points $d$ and $d'$, and the warning lamp 6 is turned on by contacting the contact member $e'$ with the contact point $d'$. At this time, since the driving circuit 17 of the relay 15 is also closed at the same time, the normally closed-contact point 16 is opened by energization of the coil 15a. With the contact point 16 closed, the return circuit 18 could close the circuit when the contact member $e$ is in contact with $d$, but since the contact point 16 is open it cannot do so, and the coil 13a of the latch-in relay 13 is therefore de-energized. Since the movable contact members e and e' are not switched to the contact points c and c' by the latch-in function of the relay 13 until the coil 13a is re-energized, the warning lamp 6 is kept lighted. If, at this time, the brake pedal is released, the coil 15a of the relay 15 is de-energized causing the normally closed-contact point to return to the contact position. The lamp 6 is turned off if the key switch 4 is turned off, but is again turned on if the key switch 4 is turned on, whereby the warning display is kept on. Also, since the coil 15a of the relay 15 is energized and causes the normally closed-contact 16 to open at every time the brake switch 9 is turned on, the coil 13a of the relay 13 cannot actuate the movable contact members from the change-over-contact points c and c'. However, if the brake switch 9 is turned on by stepping on the brake pedal after the oil pressure brake has been repaired, the abnormal pressure detecting switches 14a and 14b are switched to the OFF position and the driving circuit 17 of the relay 15 is prevented from being closed. Therefore, the normally closed-contact point 16 is not actuated and the coil 13a of the latch-in relay 13 is energized by electric current running through the return circuit 18 thereby causing the movable contact members e and e' to contact points c and c', and, then, the oil warning lamp 6 is turned off.

According to the first embodiment of the present invention, the brake switch 9 is switched on and the latch-in relay 13 is energized when the oil pressure brake is out of order, whereby the warning lamp is kept on until the failure of the oil pressure brake is fixed. But, this lighting display is cancelled by a first ON action of the brake switch after the failure has been repaired. Therefore, the apparatus of the present invention has the practical effect of preventing drivers from driving continuously without repairing a failure of the oil pressure brake.

FIG. 2 shows a second preferred embodiment wherein a switch apparatus employing the relay 15 of the first preferred embodiment of the present invention is replaced by a transistor circuit 20 for performing the switching function. In the second embodiment, the brake switch 9 leads into a transistor circuit 20 including a base circuit 21 which contains resistances R1 and R2 connected in series with the base of a transistor Tr, from between which the base circuit 21 is connected to a by-pass circuit 22, which is connected with the abnormal pressure detecting switches 14a and 14b and contains a resistance R3. Also, the collector of the transistor Tr is connected with the change-over-contact point d and the emitter is earthed. The other construction thereof is omitted, since it is same as the first embodiment.

In this arrangement of the second embodiment, if, when the brake pedal is depressed, either of the abnormal pressure-detecting switches 14a and 14b detects the failure of the oil pressure brake and is closed into the ON position, at the same time the control circuit 12 is closed by the brake switch 9 which is switched on. Thus, the latch-in relay 13 is energized, causing the movable contact members e and e' to switch to the change-over contact points d and d', whereby the warning lamp 6 is turned on, as described in the first preferred embodiment. If the brake switch 9 is again closed to the ON position, the base current applied upon the transistor Tr is shunted to the by-pass circuit 22 in which there is a resistance R3 of a small resistance value and thus the base electric potential can not be increased sufficiently for the transistor Tr to conduct, so the coil 13a of the latch-in relay 13 cannot be energized, whereby the change-over-action of the movable contacting members e and e' is prevented. However, if the brake switch 9 is set to the ON position after the oil pressure brake has been repaired, the by-pass circuit 22 is cut at the same time and sufficient voltage for conduction is impressed upon the base of the transistor Tr by the base circuit 21, and, then, the current of the control circuit 12 flows between the collector and emitter of the transistor Tr, increasing the base potential. The coil 13a of the latch-in relay 13 is energized through the switching function caused by the conduction of the transistor Tr and the movable contact members e and e' are switched to the contact points c and c'. Accordingly, the warning lamp 6 is turned off as disclosed in the first embodiment.

In view of the fact that various changes and modifications of the present invention are apparatus to those skilled in the art, they should be construed as included in the scope of the present invention unless otherwise departing from the true spirit and scope of the present invention.

What is claimed is:

1. A failure warning apparatus for a fluid pressure brake comprising brake switch means responsive to the actuation of the brake pedal of the fluid pressure brake for closing and opening an energizing circuit path in accordance therewith, latch-in relay means having a plurality of circuit making members and a latch-in relay coil for energization via the energizing circuit path of said brake switch means for controlling the movement of said plurality of circuit making members between first and second circuit positions, an abnormal pressure detecting switch means responsive to the failure of the fluid pressure brake for providing an energizing circuit path for said latch-in relay coil, said brake switch means, said latch-in relay means and said abnormal pressure detecting switch means being connected in series with each other, a warning means energized by one of said plural circuit making members in one of the first and second positions thereof providing an energizing circuit path therefor, said latch-in relay coil being responsive to the initial closing of the energizing circuit by said brake switch means and the detection of the failure of the fluid pressure brake by said abnormal pressure detecting switch means for moving said plural circuit making members from one of the first and second position to the other position thereof for enabling energization of said warning means, and circuit means for completing an energizing circuit for controlling said latch-in relay coil to cause movement of said circuit making members for de-energizing said warning means after correction of the failure of the fluid pressure brake.

2. A failure warning apparatus according to claim 1, wherein the switching circuit means comprises a relay including a relay coil connected with the abnormal pressure detecting switch means and a switch contact which is operated by the relay coil to control said latch-in relay coil operated by the abnormal pressure detecting switch means.

3. A failure warning apparatus according to claim 1, wherein the circuit means comprises a transistor circuit including resistances connected with the abnormal pressure detecting switch means and a switching transistor which is operated by the voltages of said resistances to control said latch-in relay coil operated by the abnormal pressure detecting switch means.

4. A failure warning apparatus according to claim 1, wherein said circuit means controls said latch-in relay coil to cause de-energization of said warning means upon actuation of the brake pedal and closure of the energizing circuit path for said latch-in relay coil by said brake switch means.

5. A failure warning apparatus according to claim 1, wherein said latch-in relay coil moves the circuit making members from the first position to the second position for enabling energization of the warning means, and said circuit means comprises a relay including a relay coil connected to the brake switch means and the abnormal pressure detecting switch means and a switch contact operated by said relay coil to control said latch-in relay coil, said switch contact being connected between the second position of another of said circuit making members and ground.

6. A failure warning apparatus according to claim 1, wherein said latch-in relay coil causes movement of said plural contact making members from the first position to the second position for enabling energization of said warning means, said circuit means comprising a transistor circuit including a transistor having a collector connected to the second position of another of said circuit making members, an emitter connected to ground, and a base connected to a first terminal of a first resistor, said first resistor having a second terminal connected to a first terminal of second and third resistors, said second resistor having a second terminal connected to said brake switch means and said third resistor having a second terminal connected to the first position of the another of said plural circuit making members.

7. A failure warning apparatus according to claim 1, wherein said fluid pressure brake is an oil pressure brake.

8. A failure warning apparatus according to claim 1, wherein said warning means is a light.

* * * * *